United States Patent
Soriano (10) Patent No.: US 9,164,715 B2
(45) Date of Patent: Oct. 20, 2015

(54) METHOD FOR MANAGING A PRINT JOB

(71) Applicant: Randy Cruz Soriano, San Leandro, CA (US)

(72) Inventor: Randy Cruz Soriano, San Leandro, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 0 days.

(21) Appl. No.: 13/835,174

(22) Filed: Mar. 15, 2013

(65) Prior Publication Data

US 2014/0268214 A1    Sep. 18, 2014

(51) Int. Cl.
*G06F 3/12* (2006.01)
*G06K 15/00* (2006.01)

(52) U.S. Cl.
CPC .............. *G06F 3/126* (2013.01); *G06F 3/122* (2013.01); *G06F 3/1215* (2013.01); *G06F 3/1229* (2013.01); *G06F 3/1244* (2013.01); *G06F 2206/1514* (2013.01)

(58) Field of Classification Search
CPC ............ H04N 1/00954; G06K 15/402; G06K 15/4025; G06K 15/4055; G06K 15/408; G06K 15/4085; G06K 15/409; G06F 1/3275; G06F 1/329; G06F 3/0659; G06F 3/126; G06F 3/1267; G06F 3/1296; G06F 3/122; G06F 3/1229; G06F 3/1215; G06F 3/1244; G06F 2206/1514
USPC ............... 358/1.1, 1.9, 1.13, 1.14, 1.15, 1.16, 358/1.18; 700/100, 102; 707/754
See application file for complete search history.

(56) References Cited

U.S. PATENT DOCUMENTS

| | | | |
|---|---|---|---|
| 2004/0125385 A1* | 7/2004 | Mellor et al. | 358/1.1 |
| 2004/0179211 A1* | 9/2004 | Burkes et al. | 358/1.5 |
| 2007/0052998 A1 | 3/2007 | Tsunekawa | |
| 2007/0147870 A1* | 6/2007 | Shindo et al. | 399/82 |
| 2010/0020356 A1* | 1/2010 | Kawasaki | 358/1.15 |
| 2010/0238484 A1* | 9/2010 | Komine | 358/1.15 |

* cited by examiner

*Primary Examiner* — Gabriel Garcia
(74) *Attorney, Agent, or Firm* — Buchanan Ingersoll & Rooney PC (57) ABSTRACT

A method of managing a print job is disclosed, the method includes receiving a print job on an image forming apparatus; calculating an estimated processing time and an estimated delay to print time for each page of the print job; processing each page of the print job when the estimated processing time for a page of the print job and the estimated delay to print time for the page of the print job are equal; sending each of the processed pages of the print job to a print engine associated with the image forming apparatus for printing; and printing each of the pages of the print job on the image forming apparatus upon receipt by the print engine.

13 Claims, 9 Drawing Sheets

METHOD FOR MANAGING A PRINT JOB

FIELD OF THE INVENTION

The present invention relates to a system and method of managing a print job, and more particularly, a system and method of managing a print job by delaying the start of the raster image processing (or "RIP" time) for one or more pages of a print job to reduce print memory usage and minimize print engine down time during printing of the print job.

BACKGROUND OF THE INVENTION

In today's print on demand, a print job can be generated, which may contain several pages of text and images of various complexities. These complex jobs can heavily require and occupy long processing time (i.e., raster image processing or "RIP" time) on the printing device. In sequences of print jobs, this can become a bottleneck for other jobs waiting to be processed or RIPped as the printing device has to complete ripping of the current complex job before it can proceed to the subsequent print job.

For example, a print job describes in a form of PDL (Page Description Language) such as PostScript language file, which contains sets of instructions telling the printer how to lay pixel or dots onto a page to be printed. The PDL file is processed by a RIP (Raster Image Processor) processor(s). RIP processed page is often called a rasterized page. Every rasterized page will be temporarily stored in print memory until release to print engine. Accumulation of rasterized pages can easily occupy large amount of memory space while waiting to be printed. This can occur on a print job which may contain many pages consisting of mixed data of text, images, graphics and colors of various complexities. For example, it is common to produce rasterized page the size of 100 MB which could be a thousand times larger than in its PDL form. In U.S. Patent Publication No. 2007/0052998 A1, the application discloses controlling the output timing of the rasterized pages to minimize down time of the print engine. While this approach can reduced print engine down time, there can be many rasterized pages being held temporarily which can occupy large amounts of memory space in the printer for the duration of the delay of the page output timing to the print engine.

SUMMARY OF THE INVENTION

In consideration of the above issues, it would be desirable to improve the management or processing of a print job by monitoring and/or controlling the processing (or RIP) status for the print job using a print job management module and/or a printer controller to delay the starting of the RIP process, memory consumption can be minimized since the processed page is immediately released to the print engine.

In accordance with an exemplary embodiment, a method of managing a print job is disclosed, the method includes receiving a print job on an image forming apparatus; calculating an estimated processing time and an estimated delay to print time for each page of the print job; processing each page of the print job when the estimated processing time for a page of the print job and the estimated delay to print time for the page of the print job are equal; sending each of the processed pages of the print job to a print engine associated with the image forming apparatus for printing; and printing each of the pages of the print job on the image forming apparatus upon receipt by the print engine.

In accordance with a further exemplary embodiment, an image forming apparatus having executable instructions for managing a plurality of print jobs is disclosed, the instructions comprising: receiving a print job on the image forming apparatus; calculating an estimated processing time and an estimated delay to print time for each page of the print job; processing each page of the print job when the estimated processing time for a page of the print job and the estimated delay to print time for the page of the print job are equal; sending each of the processed pages of the print job to a print engine associated with the image forming apparatus for printing; and printing each of the pages of the print job on the image forming apparatus upon receipt by the print engine.

In accordance with another exemplary embodiment, a computer program product comprising a non-transitory computer usable medium having a computer readable code embodied therein for managing a plurality of print jobs on an image forming apparatus is disclosed, the computer readable program code configured to execute a process, the process comprising the steps of: receiving a print job on an image forming apparatus; calculating an estimated processing time and an estimated delay to print time for each page of the print job; processing each page of the print job when the estimated processing time for a page of the print job and the estimated delay to print time for the page of the print job are equal; sending each of the processed pages of the print job to a print engine associated with the image forming apparatus for printing; and printing each of the pages of the print job on the image forming apparatus upon receipt by the print engine.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

DESCRIPTION OF THE PREFERRED EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

In accordance with an exemplary embodiment, a method of managing a print job to use memory efficiently for rasterized page data by delaying the start of the RIP process of a page while minimizing the print engine down time during printing of the entire print job is disclosed. In accordance with an exemplary embodiment, each and every page in a print job can be analyzed to determine how much time it will take to process and ready to print. Based on the estimated RIP process time for each page and page output interval timing of print engine, start timing of RIP process can be estimated. RIP process starts when the page estimated RIP process is approaching the page output interval timing of the print engine. In accordance with an exemplary embodiment, by delaying the start of RIP processing, memory consumptions can be minimized since the processed page is immediately release to print engine.

For example, in accordance with an exemplary embodiment, a print engine with a throughput of 30 pages per minute (ppm), a rasterized page must be prepared approximately every 2 seconds to maintain the highest throughput. For example, given a print job consisting of 4 pages, having an estimated time for completing the RIP processing of the 4 pages print job of 2, 1, 2, and 10 seconds, respectively. However, as described, page 4 of the print job requires longer RIP process time. In known systems, as preceding pages are rasterized and held temporarily to minimize print engine down time. However, to temporarily delay the printing can be a costing accumulation of printer memory usage while waiting to be printed. In accordance with an exemplary embodiment of the present disclosure, even if page 4 is determined to take longer RIP process time, the start of RIP processing for each page is taken the basis of estimating how much time requires for each page to delay until approaching the 2 seconds page output interval timing while it still maintain the print engine throughput.

Figure 1:
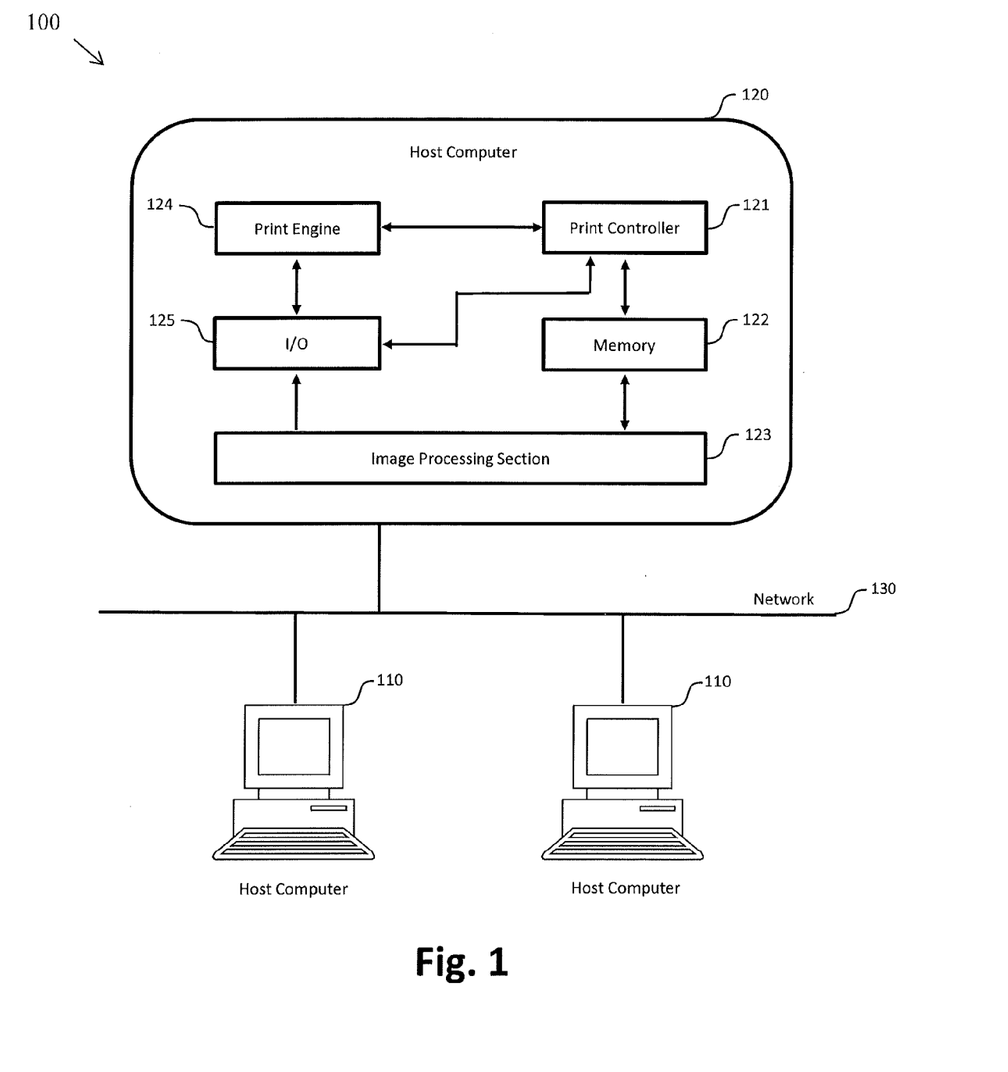
FIG. 1 is an illustration of a data processing system, which includes a client device in the form of a computer device and an image forming apparatus or printer.

FIG. 1 is an illustration of a typical data processing system 100, which includes a client device (or host computer) 110 and an image forming apparatus 120 (or printer) connected to the client device 110. The client device 110 preferably includes a processor or central processing unit (CPU), one or more memories for storing software programs and data (such as files to be printed). The client device 110 also includes an operating system (OS), which manages the computer hardware and provides common services for efficient execution of various software programs. The processor or CPU carries out the instructions of a computer program, which operates and/or controls at least a portion of the functionality of the client device 110. It can be appreciated that examples of client devices 110 include and are not limited to personal computers, image forming apparatuses, routers, and/or personal digital assistants (PDAs).

In accordance with an exemplary embodiment, the image forming apparatus 120 is preferably in the form of an industrial image forming apparatus or multi-functional printer 120 connected to the client device 110. The client device 110 submits print jobs to the image forming apparatus (printer or printing device) 120 by transmitting data representing the documents to be printed and information describing the print job. As shown in FIG. 1, the image forming apparatus (for example, printer/printing device) 120 typically includes a printer controller (or firmware) 121, a memory section 122 preferably in the form of a hard disk drive (HDD), an image processing section (or data dispatcher) 123, a print engine 124, and an input/output (I/O) section 125.

The controller 121 typically includes a central processing unit (CPU), a random access memory (RAM), and a read only memory (ROM). The central processing unit is configured to execute a sequence of stored instructions (i.e., a computer program). It can be appreciated that the controller 121 also includes an operating system (OS), which acts as an intermediary between the software programs and hardware components within the image forming apparatus 120. The operating system (OS) manages the computer hardware and provides common services for efficient execution of various application software. In accordance with an exemplary embodiment, the controller 121 processes the data and job information received from the client device 110 to generate a print image.

The image processing section 123 carries out image processing under the control of the controller 121, and sends the processed print image data to the print engine 124. In one embodiment, the image processing section 123 is preferably capable of processing multiple print jobs or sub-jobs in parallel and independently. For instance, the image processing section 123 can include a CPU that contains multiple cores therein to realize the multiple RIP modules explained in detail later. The CPU used constituting a part of the controller can be commonly used for the image processing section. The print engine 124 forms an image on a recording sheet based on the image data sent from the image processing section. The I/O section 125 performs data transfer with the client device 110. The controller 121 is programmed to process data and control various other components of the image forming apparatus or printer to carry out the various methods described herein. The hard disk drive (HDD) or storage device stores digital data and/or software programs for recall by the controller. In accordance with an exemplary embodiment, the digital data includes resources, which can include graphics/images, logos, form overlays, fonts, etc.

The input/output (I/O) port 125 provides communications between the printer section and the client device 110 and receives page descriptions (or print data) from the host for processing within the image forming apparatus 120. In accordance with an exemplary embodiment, the operation of printer section commences when it receives a page description from the client device 110 via I/O port in the form of a print job data stream. The page description may be any kind of page description languages (PDLs), such as PostScript® (PS), Printer Control Language (PCL), Portable Document Format (PDF), XML Paper Specification (XPS), and so on. Examples of image forming apparatuses 120 consistent with exemplary embodiments of the invention include industrial printers, and/or multi-function printers or peripherals (MFP).

The client device 110 and the image forming apparatus (or printing device) 120 are preferably connected to one another via a network 130. Examples of the network 130 consistent with embodiments of the invention include, but are not limited to, the Internet, an intranet, a local area network (LAN) and a wide area network (WAN). The client device 110 and the image forming apparatus 120 can also be connected with a wire and/or wireless technology by using radio frequency (RF) and/or infrared (IR) transmission.

Figure 2:
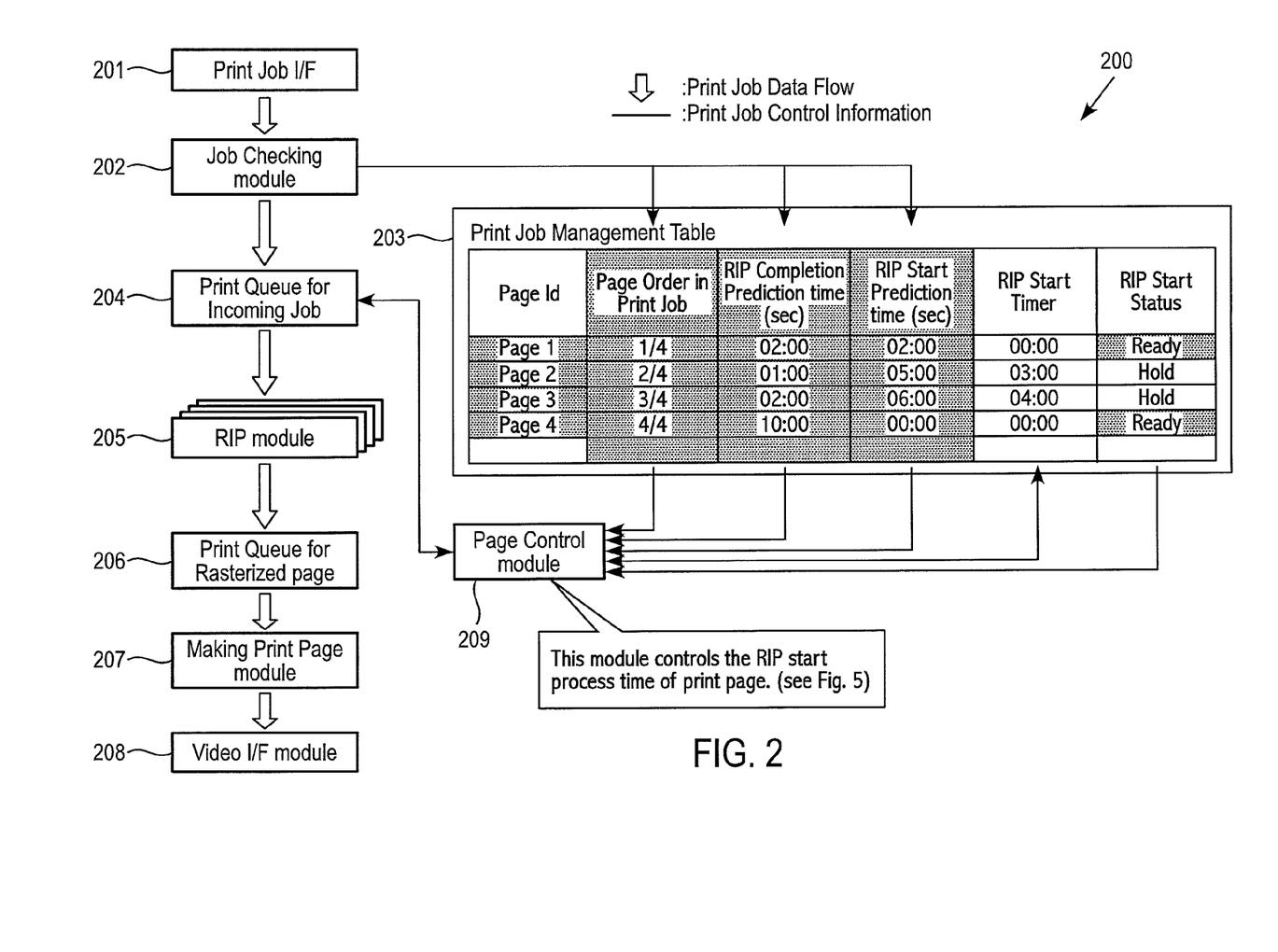
FIG. 2 is an illustration of the print job management module in accordance with an exemplary embodiment.

FIG. 2 is an illustration of the print job management module 200 in accordance with an exemplary embodiment. In accordance with an exemplary embodiment, the print job management module 200 is part of the firmware of the image forming apparatus or printing device 120 and includes a print job I/F (interface) a job checking module 202, a print job management table 203, a print queue for incoming jobs 204, a processing module (or RIP module) 205, a print queue for rasterized data 206, a making print job module 207, a page control module 209, and a video I/F (interface) module 210.

As shown in FIG. 2, as an incoming print job is received, the job checking module 202 manages the print job, checks and monitors pages of the print job. In accordance with an exemplary embodiment, the job checking module 202 analyzes the PDL source data and provides a best estimated time it may take to complete the RIP process of the print job. Once the RIP Completion Prediction time has been determined, the RIP Start Prediction time is calculated. The RIP Start Prediction time is calculated based on the (estimated Total Print job completion−Page n (starting from end page)*(Print interval timing)−RIP Completion Prediction time. Simultaneously, a checking mechanism called Page Control module 209, which particularly tracks the print job and controls the start timing of the RIP process for every page. If the RIP Start Prediction time of a page is equal to 0, the page is immediately sent to the RIP module 205 for RIP processing. After the page is rasterized, the page is immediately sent to the Print Queue for Rasterized page module and the page is ready to print. In accordance with an exemplary embodiment, if the RIP Start Prediction time is not equal to 0, the print job is temporarily put on hold and a counter up timer is run until it reached the same time value as the RIP Start Prediction time. Once the timer reached the Print Queue for Rasterized page module Start Prediction time, job will be released to the RIP module 205. Then, the processed job is sent to the Print Job Making module and is ready to print. In accordance with an exemplary embodiment, the RIP module 205 can consist of multiple processors and can process multiple pages simultaneously, and consequently processing time can be sped up.

In accordance with an exemplary embodiment, for example, a Print Job is consisting of multiple pages—Page 1, Page 2, Page 3, and Page 4 and having a RIP Completion Prediction time as 2, 1, 2, 10 seconds, respectively. For a print engine with throughput of approximately 30 pages per minute (ppm), the print image must be ready to print in 2 seconds intervals in order to maintain the print engine highest throughput. In accordance with an exemplary embodiment, the Print Job Checking module 202 analyzes all the pages data in the print job and predicts the RIP Completion Prediction time. In accordance with an exemplary embodiment, since page 4 is determined to have a longer processing time, rather than begin the RIP process immediately, the Page Control module 202 can decides to hold the preceding pages for RIP processing. Thus, in accordance with an exemplary embodiment, the start of processing for each of the preceding pages only begins when estimated RIP Completion Prediction time is approaching the 2 seconds print interval timing. For example, in this case, the RIP processing starts as follows—Page 1 in 2 sec, Page 2 in 5 sec, and Page 3 in 6 sec respectively. As each page is processed, the page is immediately released and is ready for printing. Since jobs are processed and released immediately, the print job no longer occupies a large amount of memory buffer (see FIG. 6B)

Figure 3:
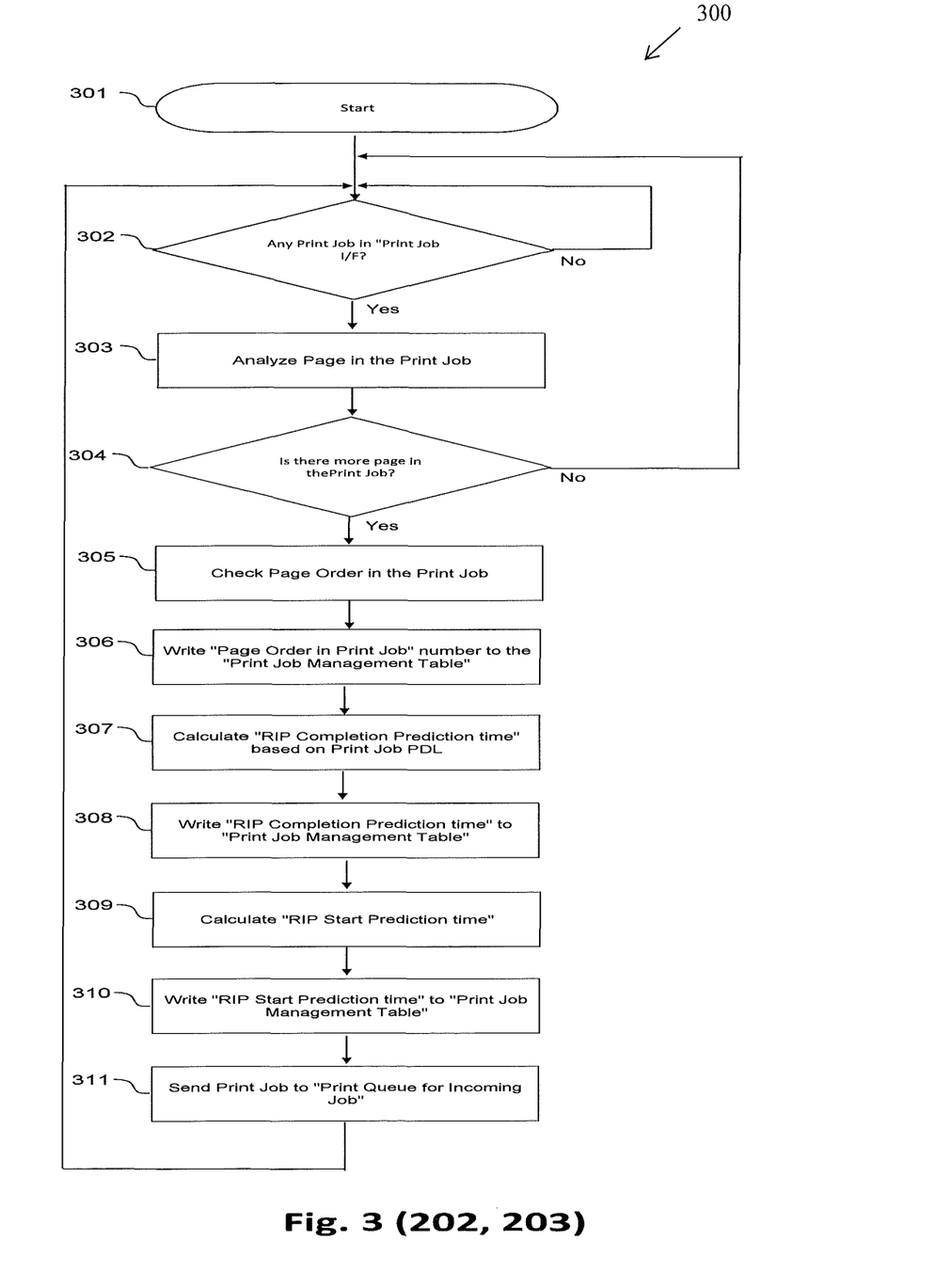
FIG. 3 is an illustration of a flowchart describing the process of the Job Checking module in accordance with an exemplary embodiment.

FIG. 3 is an illustration of a flowchart 300 describing the process of the Job Checking module 202 in accordance with an exemplary embodiment. As shown in FIG. 3, the process begins in step 301, wherein the Job Checking module 202 is activated. In step 302, the Job Checking module 202 checks to determine if any print jobs are in the "print job I/F" (i.e., "print job interface"). If the print job I/F does not contain any print jobs, the process stops and the process is repeated until a print job is received. In step 303, once the print job I/F includes at least one print job, the Job Checking module 202 analyzes each of the pages within the print job. In step 304, if the print job does not include more than one page in the print job, the print job is sent for processing. If the print job includes more than one page (or "yes"), in step 305, the page order of the print job is checked. In step 306, the Job Checking module 202 writes the "page order in print job" number and sends the page order for processing to the "print job management table" 203. In step 307, a "RIP completion prediction time" based on the print jobs PDL (page description language) is calculated. In step 308, "RIP completion Prediction Time" is written to the "Print Job Management Table" 204. In step 309, the "RIP Start Prediction time" is calculated. In step 310, the "RIP Start Prediction time" is written to the "Print job management table" 203. In step 311, the print job is sent to the "Print Queue for Incoming Job".

Figure 4:
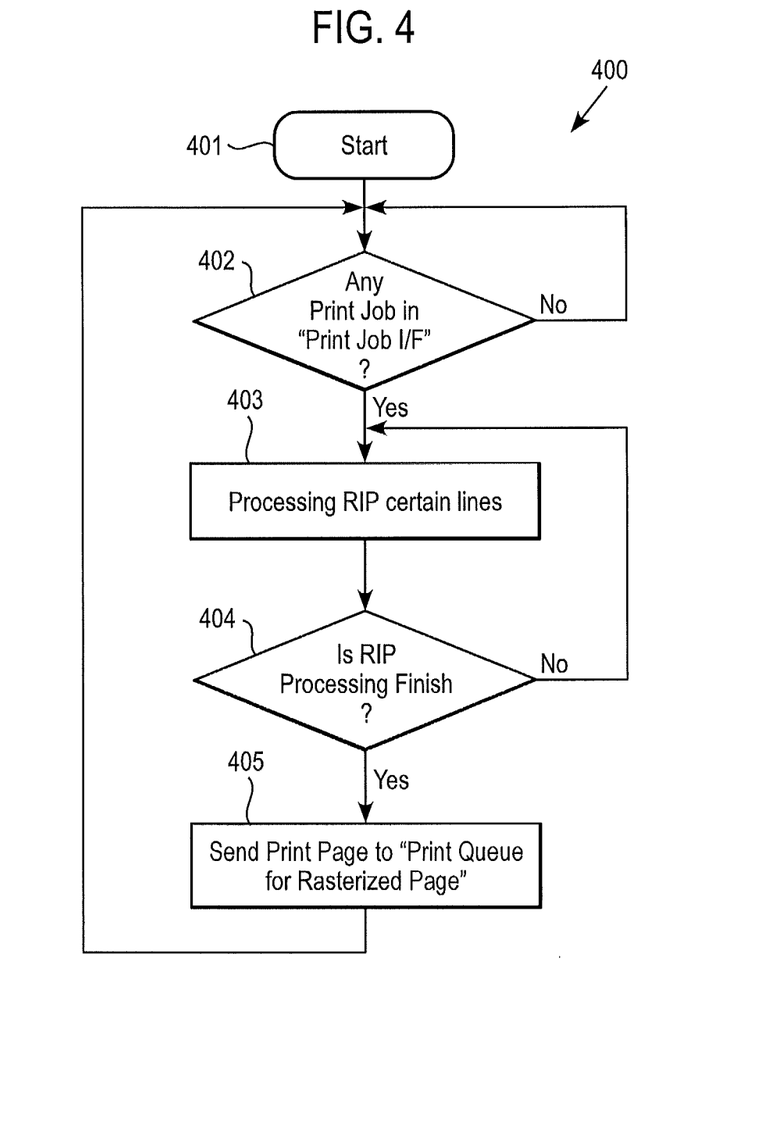
FIG. 4 is an illustration of a flowchart describing the process in the RIP module in accordance with an exemplary embodiment.

FIG. 4 is an illustration of a flowchart, which described the process 400 in the RIP module 205 in accordance with an exemplary embodiment. As shown in FIG. 4, in step 401, the RIP module 205 is activated. In step 402, the RIP module 206 determines if there is any print jobs in the "Print Job I/F" 201. If not print jobs are in the "Print Job I/F", the process returns to step 402 and the process is repeated. If a print job is in the "Print Job I/F", in step 403, processing RIP certain lines is performed. In step 4045, the RIP module determines if the RIP processing is finished. If the RIP processing is not finished, the process returns to step 403. Alternatively, if the RIP processing is finished, in step 405, print information is sent to "Print Queue for Rasterized Page" 206.

Figure 5:
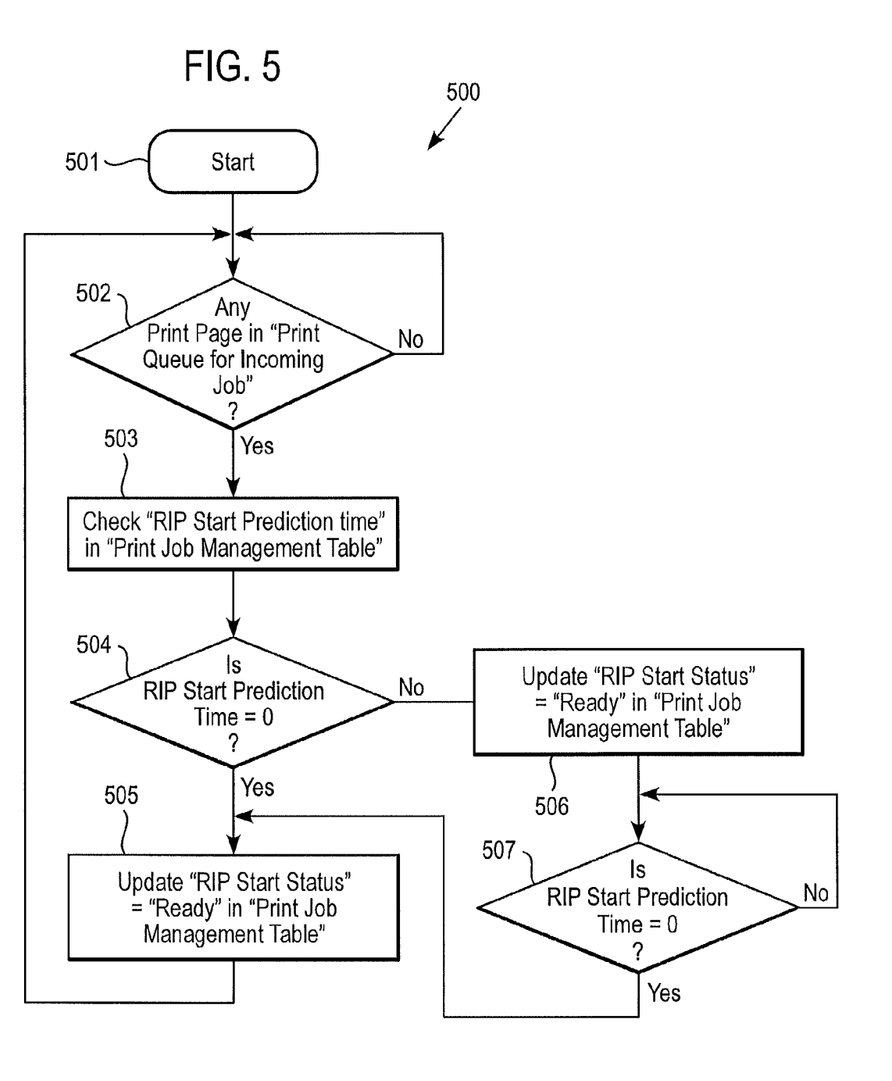
FIG. 5 is an illustration of a describing the process in the Page Control module in accordance with an exemplary embodiment.

FIG. 5 is an illustration of a flowchart, which describes the process 500 in the Page Control module 209. In step 501, the process of the Page Control module 209 is activated. In step 502, the Page Control module 207 determines if there is any print page in "Print Queue for Incoming Job". If not, the process returns to step 502. If the answer is yes (e.g., updating information is available), in step 503, the "RIP Start Prediction time" in the Print Job Management table 203 is checked. In step 504, if the RIP Start Prediction time is equal to zero, the process continues to step 505, wherein Page Control Module updates the "RIP Start Status" to "Ready" in the Print Job Management Table 203. If the RIP Start Prediction time is greater than zero, the process continues to step 506, wherein the Page Control module update the "RIP Start Status" to "Not Ready" in the Print Job Management Table 203. In step 507, the Page Control module checks to determine if the "RIP Start Prediction Time" equal to zero, if not, the process returns to step 507 where the process is repeated until the "RIP Start Prediction Time" is equal to zero. In step 507, once the "RIP Start Prediction Time" is equal to zero, the process continues to step 505, where the Page Control Module updates the "RIP Start Status" to "Ready" in the Print Job Management Table 203.

Figure 6A:
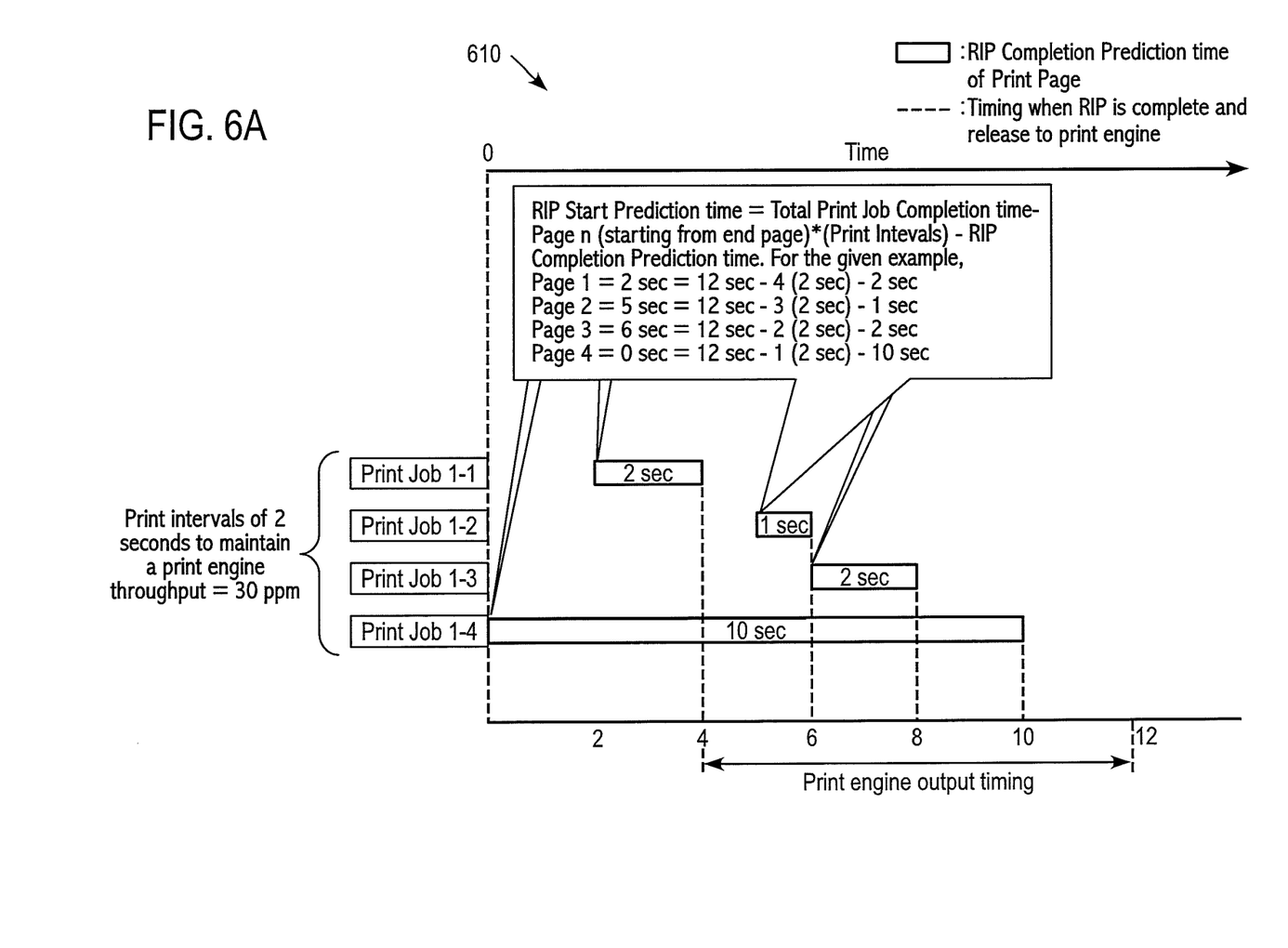
FIG. 6A is an illustration of data processing showing the analysis of RIP Start Prediction timing on a given engine print interval in accordance with an exemplary embodiment.
Figure 6B:
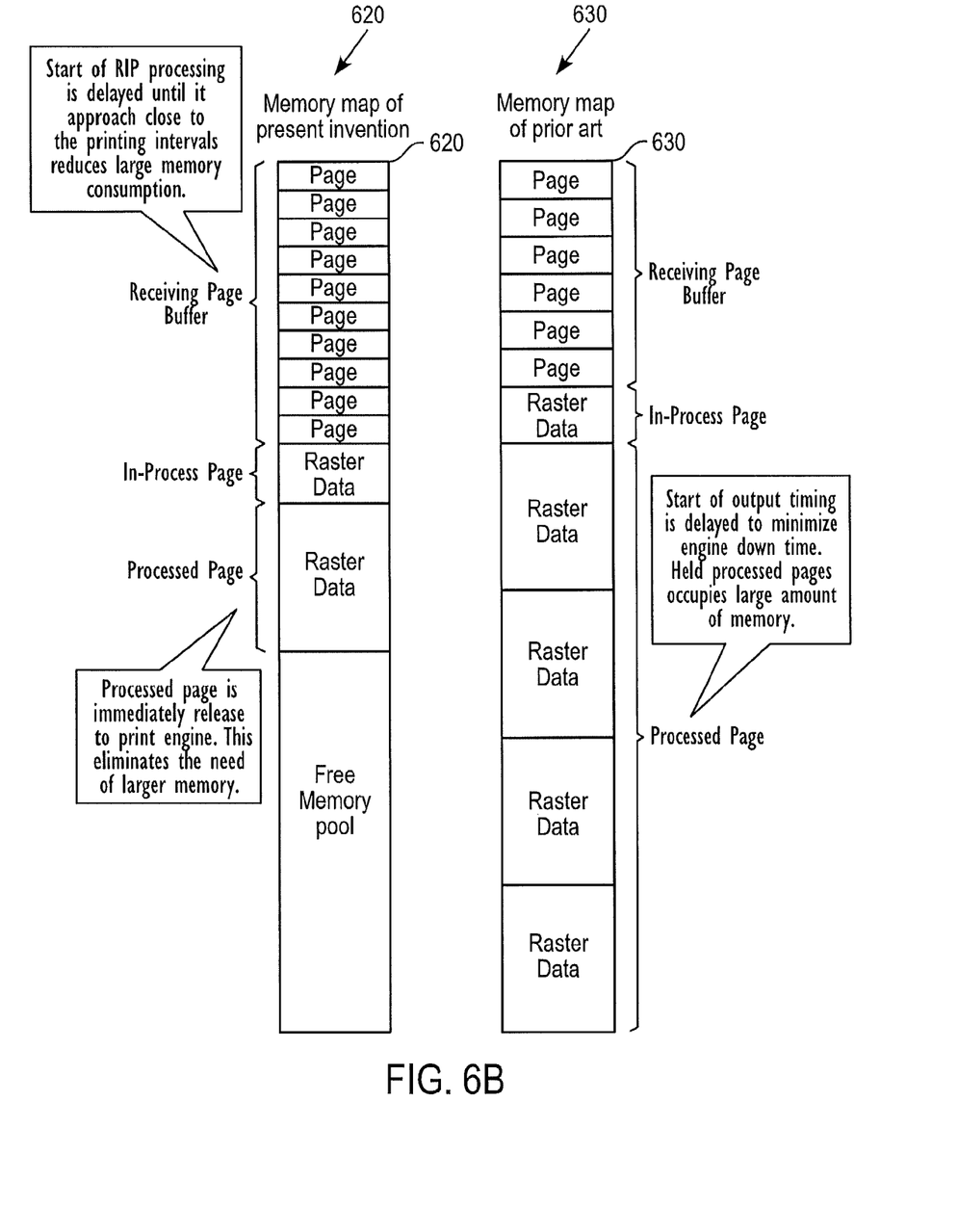
FIG. 6B is an illustration of data processing showing the memory mapping of print job in printer memory in accordance with an exemplary embodiment.

FIG. 6A is an illustration of data processing 610 showing the analysis of RIP Start Prediction timing on a given engine print interval. FIG. 6B is an illustration of data processing 620 showing the memory mapping of print job in printer memory. In accordance with an exemplary embodiment of the disclosure, the incoming pages are temporarily stored in the Receiving Page buffer, analyzed, and delayed the start of RIP process to reduce large memory consumption. As rasterized page becomes ready, is immediately sent to the print engine and the consumed memory is freed up. In known systems 630, incoming pages are immediately process and stored in the Processed Page buffer. However, known methods can delay the start of output timing in order to minimize print engine down time. However, processed pages or raster data occupies much larger memory space as it continues to accumulate.

Figure 7A:
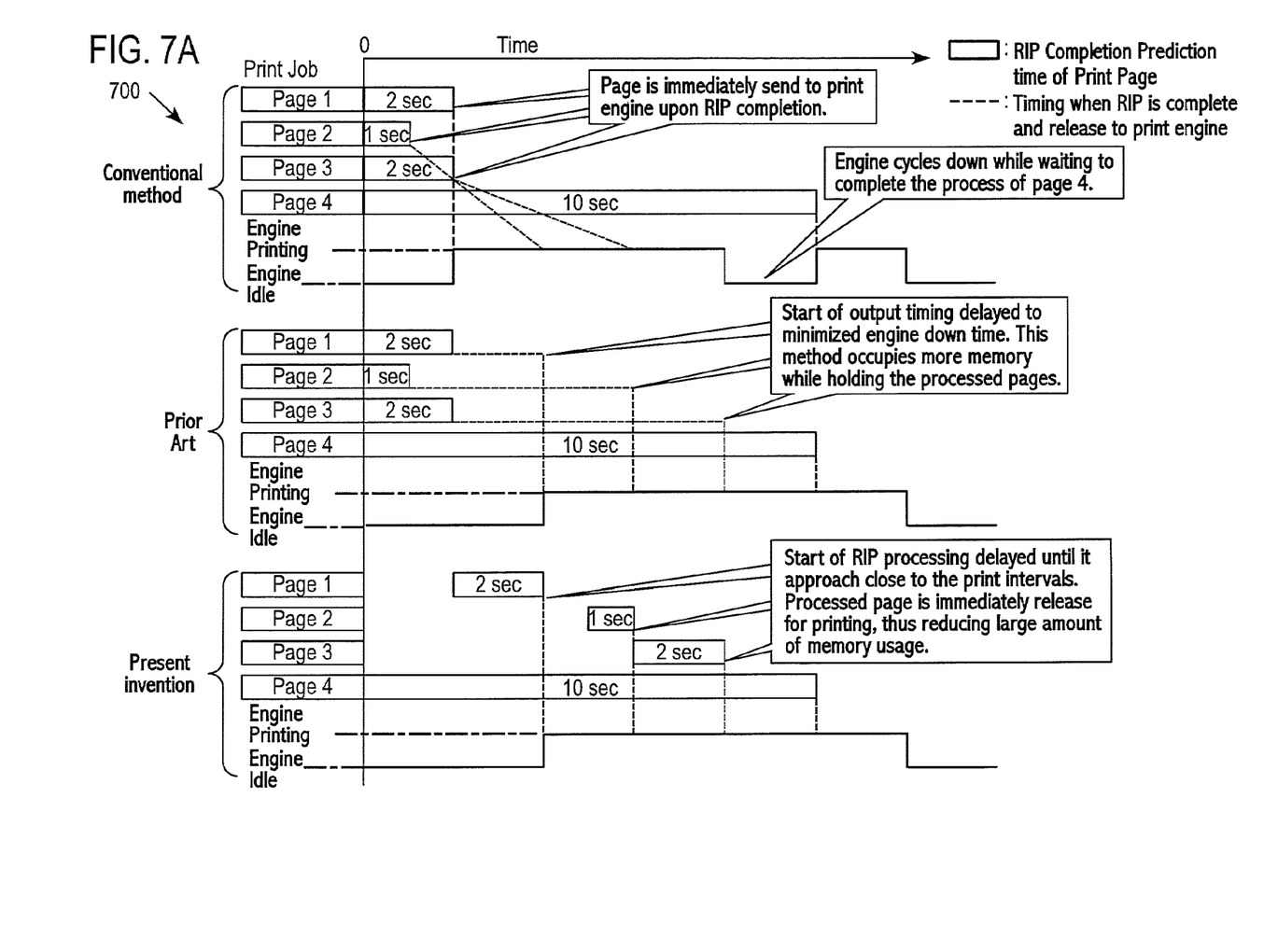
FIGS. 7A and 7B are illustrations of data processing showing the benefits of the new invention over related art in accordance with an exemplary embodiment.
Figure 7B:
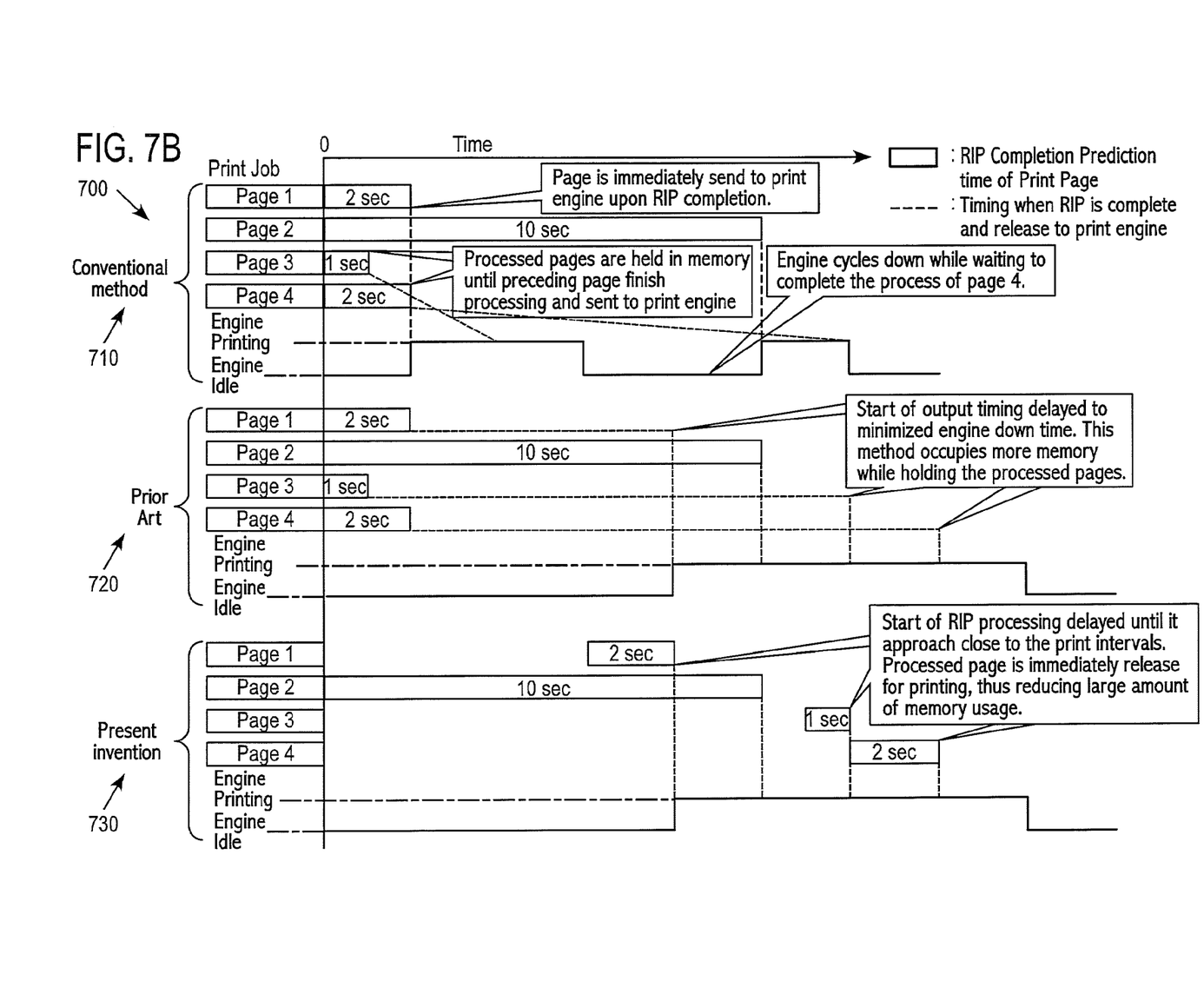

FIGS. 7A and 7B are illustrations of data processing showing the benefits of the new invention over related art. For example, in a known method 710, a received page is immediately process and release for printing upon RIP completion. As shown in FIG. 7A, this method may cause engine down time if a subsequent page requires much longer time to process. In another known method 720, a received page is immediately process but the output timing for processed page is delayed in order to minimize engine down time. However, this method occupies much larger memory for held processed pages.

In accordance with an exemplary embodiment of the present disclosure 730, each received page is analyzed and the start of RIP processing is delayed until the processing time approaches or is equal to the print interval, which minimize memory usage and maintain a high print engine throughput. In accordance with an exemplary embodiment, a process page is immediately released for printing upon completion of the processing.

In accordance with another exemplary embodiment, a computer program product comprising a non-transitory computer usable medium having a computer readable code embodied therein for managing a plurality of print jobs on an image forming apparatus is disclosed, the computer readable program code configured to execute a process, the process comprising the steps of: receiving a print job on an image forming apparatus; calculating an estimated processing time and an estimated delay to print time for each page of the print job; processing each page of the print job when the estimated processing time for a page of the print job and the estimated delay to print time for the page of the print job are equal; sending each of the processed pages of the print job to a print engine associated with the image forming apparatus for printing; and printing each of the pages of the print job on the image forming apparatus upon receipt by the print engine.

The computer usable medium, of course, may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

It will be apparent to those skilled in the art that various modifications and variation can be made to the structure of the present invention without departing from the scope or spirit of the invention. For instance, the above mentioned embodiment is discussed in the condition where the multiple sub-print jobs are preliminary prepared in the client device 110, and they are sent to image forming apparatus 120. However, the present invention is not limited to this specific implementation; the present invention is applicable to the case where a single print job is forwarded from the client device 110 to the image forming apparatus 120, and then the image forming apparatus 120 separates or divides the single print job into multiple sub-print jobs before processing these sub-print jobs. In this alternative implementation, the image forming apparatus 120 can have the control of such separation of the single print job, and therefore, it is beneficial for the image forming apparatus 120 to decide how many sub-print jobs should be made in accordance with the resource conditions of the image forming apparatus 120. In view of the foregoing, it is intended that the present invention cover modifications and variations of this invention provided they fall within the scope of the following claims and their equivalents.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein. The present invention includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to".

In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. In this disclosure and during the prosecution of this application, the terminology "embodiment" can be used to describe any aspect, feature, process or step, any combination thereof, and/or any portion thereof, etc. In some examples, various embodiments may include overlapping features.

What is claimed is:

1. A method of managing a print job, the method comprising:
   receiving a print job on an image forming apparatus, wherein the print job is described in a page description language (PDL) and comprises two or more pages;
   calculating, from the print job described in the PDL, an estimated processing time and an estimated delay to print time for each page of the print job;
   individually processing each page of the print job when the estimated processing time for a page of the print job and the estimated delay to print time for the page of the print job are equal, wherein the processing of each page of the print job comprises converting each page of the print job to a rasterized page;
   delaying the converting of each page of the print job to the rasterized page when the estimated delay to print time for the page of the print job is greater than the estimated processing time for the page of the print job;
   immediately releasing each of the rasterized pages of the print job to a print engine associated with the image forming apparatus for printing; and
   printing each of the pages of the print job on the image forming apparatus upon receipt by the print engine.

2. The method of claim 1, comprising:
   assigning each of the pages of the print job to a print job management module to determine the estimated processing time and the estimated delay to print time for each of the pages of the print job.

3. The method of claim 2, comprising:
   providing a print engine interval time for the print engine;
   analyzing the print job to determine the estimated processing time to complete the processing of each page of the print job; and
   calculating a processing start time based on an estimated total print completion time for a total number of pages of the print job, the print engine interval time for the print engine and the estimated processing time for each page of the print job.

4. The method of claim 1, comprising:
processing the plurality of pages of the print job with two or more processors.

5. The method of claim 1, comprising:
immediately releasing each of the rasterized pages to the print engine for printing.

6. An image forming apparatus comprises a processor and memory having executable instructions for managing a plurality of print jobs, the instructions comprising:
receiving a print job on the image forming apparatus, wherein the print job is described in a page description language (PDL) and comprises two or more pages;
calculating, from the print job described in the PDL, an estimated processing time and an estimated delay to print time for each page of the print job;
individually processing each page of the print job when the estimated processing time for a page of the print job and the estimated delay to print time for the page of the print job are equal, wherein the processing of each page of the print job comprises converting each page of the print job to a rasterized page;
delaying the converting of each page of the print job to the rasterized page when the estimated delay to print time for the page of the print job is greater than the estimated processing time for the page of the print job;
immediately releasing each of the rasterized pages of the print job to a print engine associated with the image forming apparatus for printing; and
printing each of the pages of the print job on the image forming apparatus upon receipt by the print engine.

7. The apparatus of claim 6, comprising:
a print job management module, which receives each of the pages of the print job and determines the estimated processing time and the estimated delay to print time for each of the pages of the print job.

8. The apparatus of claim 7, wherein the print job management module performs the following steps:
determines a print engine interval time for the print engine;
analyzes the print job to determine the estimated processing time to complete the processing of each page of the print job; and
calculates a processing start time based on an estimated total print completion time for a total number of pages of the print job, the print engine interval time for the print engine and the estimated processing time for each page of the print job.

9. The apparatus of claim 6, comprising:
a job checking module, which determines a number of pages in the print job, and wherein the job checking module performs the following steps:
divides the print job into a plurality of pages for processing; and
sends the plurality of pages to the print job management module for determination of the estimated processing time and the estimated delay to print time for each of the pages of the print job.

10. The apparatus of claim 6, comprising:
two or more processors for processing the print job.

11. A computer program product comprising a non-transitory computer usable medium having a computer readable code embodied therein for managing a plurality of print jobs on an image forming apparatus, the computer readable program code configured to execute a process, the process comprising the steps of:
receiving a print job on an image forming apparatus, wherein the print job is described in a page description language (PDL) and comprises two or more pages;
calculating, from the print job described in the PDL, an estimated processing time and an estimated delay to print time for each page of the print job;
individually processing each page of the print job when the estimated processing time for a page of the print job and the estimated delay to print time for the page of the print job are equal, wherein the processing of each page of the print job comprises converting each page of the print job to a rasterized page;
delaying the converting of each page of the print job to the rasterized page when the estimated delay to print time for the page of the print job is greater than the estimated processing time for the page of the print job;
immediately releasing each of the rasterized pages of the print job to a print engine associated with the image forming apparatus for printing; and
printing each of the pages of the print job on the image forming apparatus upon receipt by the print engine.

12. The computer program of claim 11, comprising:
assigning each of the pages of print job to a print job management module to determine the estimated processing time and the estimated delay to print time for each of the pages of the print job.

13. The computer program of claim 12, comprising:
providing a print engine interval time for the print engine;
analyzing the print job to determine the estimated processing time to complete the processing of each page of the print job; and
calculating a processing start time based on an estimated total print completion time for a total number of pages of the print job, the print engine interval time for the print engine and the estimated processing time for each page of the print job.

\* \* \* \* \*